United States Patent [19]
Cruciani

[11] Patent Number: 6,116,508
[45] Date of Patent: Sep. 12, 2000

[54] PORTABLE CODE READING AND CURSOR POINTING

[75] Inventor: Paolo Cruciani, Montecaorso Scalo, Italy

[73] Assignee: Datalogic S.p.A., Italy

[21] Appl. No.: 09/116,920

[22] Filed: Jul. 17, 1998

[30] Foreign Application Priority Data

Jul. 18, 1997 [EP] European Pat. Off. .............. 97830365

[51] Int. Cl.[7] .............................. G06K 7/10; G06K 15/00
[52] U.S. Cl. ................................ 235/462.13; 235/462.45; 235/472.01
[58] Field of Search ........................ 235/472.01, 462.45, 235/462.13, 454

[56] References Cited

U.S. PATENT DOCUMENTS 4,906,843  3/1990  Jones et al. ..................... 235/472.01 X
5,633,489  5/1997  Dvorkis et al. .................... 235/472.01
5,801,371  9/1998  Kahn et al. ........................ 235/472.01

FOREIGN PATENT DOCUMENTS 3109630  5/1991  Japan .
8235435  9/1996  Japan .

*Primary Examiner*—Karl D. Frech
*Attorney, Agent, or Firm*—Hall, Priddy, Myers & Vande Sande

[57] ABSTRACT

A portable code reading device, in particular for reading optical codes, wherein a hand-held casing supports an electronic viewing device for generating signals related to the image of an examined optical code, and an electronic circuit cooperating with the viewing device to generate first digital data representing the examined optical code. The reading device also has a manually operated pointing device for generating second digital data by which to control a pointer of a remote processing device having a graphic interface usable in conjunction with the pointer.

17 Claims, 7 Drawing Sheets

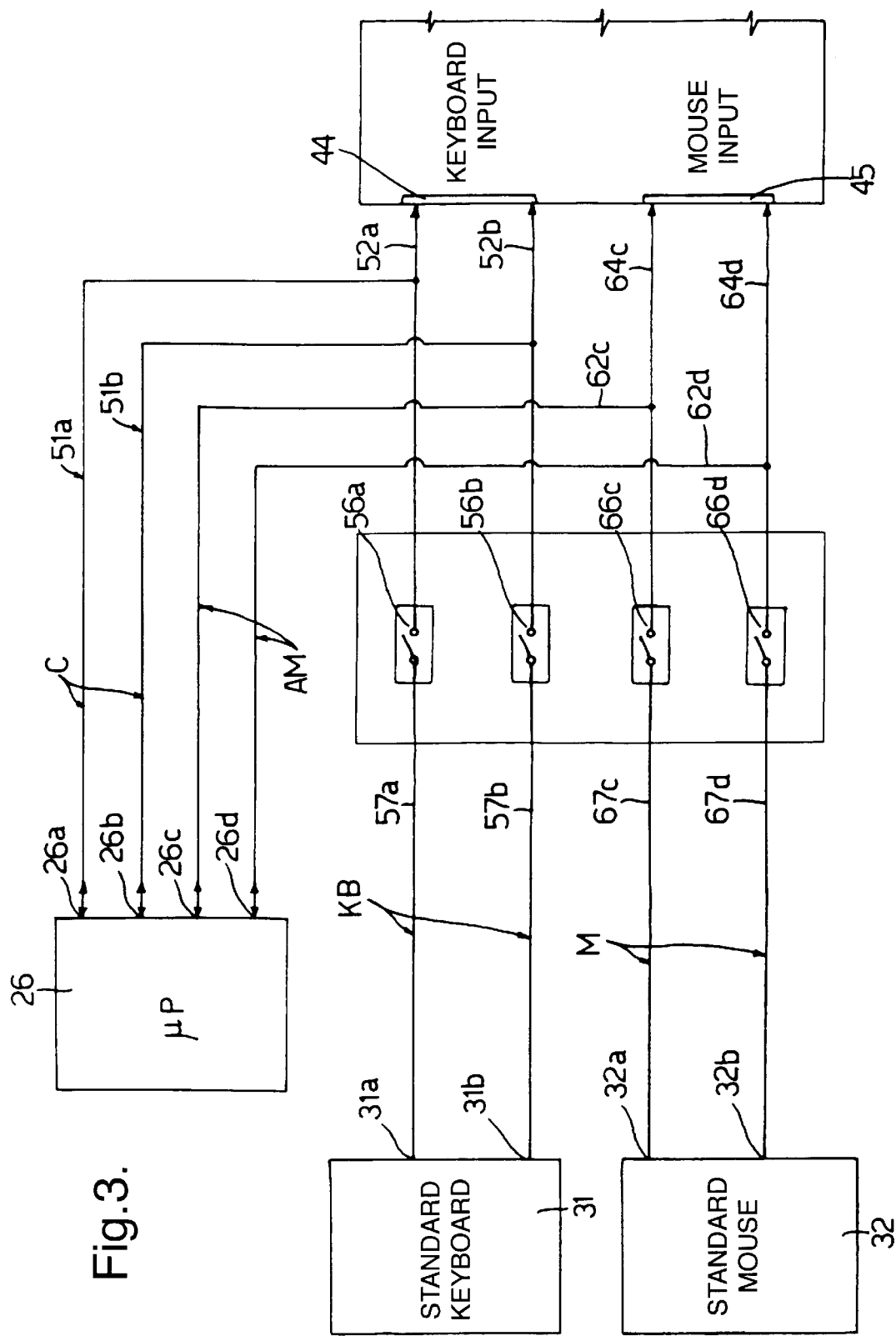

PORTABLE CODE READING AND CURSOR POINTING

BACKGROUND OF THE INVENTION

The present invention relates to a portable code reading device. Portable code reading devices, in particular for reading optical codes, are known in which a hand-held casing houses an optical beam emitting (e.g. LED) device for lighting an optical code, in particular a bar code, and a viewing device (e.g. a CCD sensor) for receiving the radiation diffused by the optical code and conveyed to the viewing device by a focusing device on the casing. Known reading devices comprise an electronic microprocessor circuit for processing the electric signals from the viewing device and generating a succession of digital data representing optical-code-associated characters, and which may be memorized in a memory unit cooperating with the microprocessor, and later transferred to a remote processing unit, e.g. a personal computer.

The memorized data is transferred to the personal computer via an interface known commercially as a WEDGE, and which provides for establishing an electric data transmission connection between the connection port of the personal computer keyboard and an output of the reading device in which the digital data is memorized. Known interfaces also provide for maintaining the data transfer connection between the personal computer keyboard and the computer itself, and therefore for transmitting the memorized digital data or the decoded results and the data from the keyboard to the connection port of the personal computer keyboard. Besides actual transfer of the memorized data, data transfer procedures also involve several other commands, e.g. option selection, accessory data entry, transfer confirmation, etc.

Modern personal computers also employ graphic interface programs in which a movable graphic pointer is used to impart various commands necessary to operation of the program.

SUMMARY OF THE INVENTION

It is an object of the present invention to provide an optical code reading device for easily and effectively transferring memorized data, and which at the same time may be used to advantage with modern graphic interface programs.

According to the present invention, there is provided a portable code reading device comprising: electronic reading means for generating signals related to an examined code; control circuit means cooperating with said electronic reading means to generate first digital data representing the examined code; and supporting means for supporting said electronic reading means and said circuit means; characterized by also comprising pointing means operated manually and for generating second digital data by which to control a pointer of a remote processing device comprising an interface, in particular a graphic interface, usable in conjunction with said pointer.

Said electronic reading means preferably comprise optical code reading means; and the device according to the present invention comprises interface means for transferring said first digital data and said second digital data to said remote processing device, and memory means for at least temporarily memorizing said first digital data.

BRIEF DESCRIPTION OF THE DRAWINGS

A non-limiting embodiment of the present invention will be described by way of example with reference to the accompanying drawings, in which:

FIG. 3 shows a variation of the FIG. 2 circuit;

DETAILED DESCRIPTION OF THE INVENTION

Figure 1:
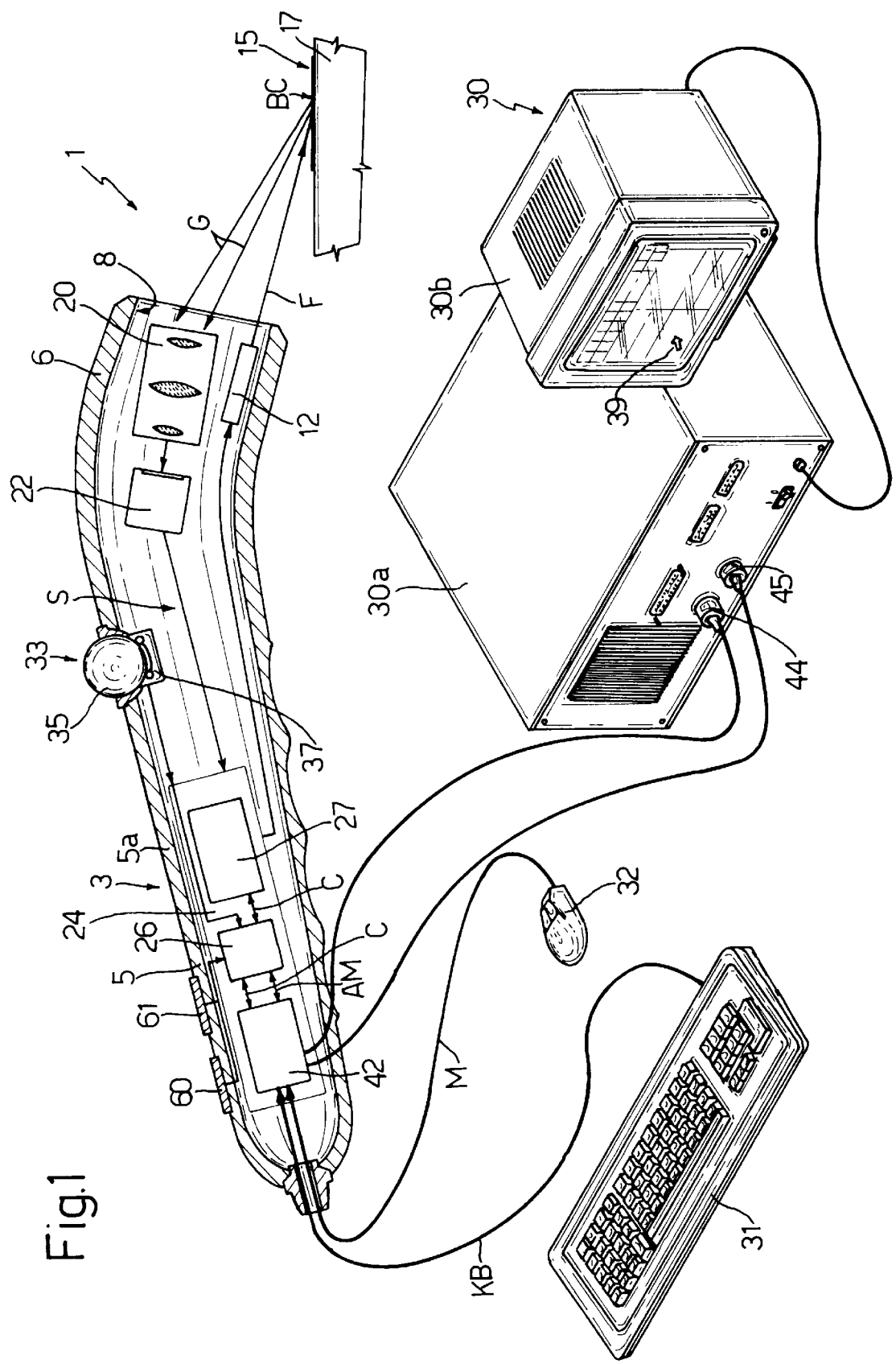
FIG. 1 shows, schematically, a portable code reading device, in particular for reading optical codes, in accordance with the teachings of the present invention.

Number 1 in FIG. 1 indicates a portable code reading device, in particular for reading optical codes. Though optical codes are referred to in the following description, the code reading device may also be capable of reading other than optical, e.g. radiofrequency, codes. Reading device 1 comprises a hand-held casing 3 defined, for example, by a shaped tubular body having a substantially C-shaped cross section and comprising a hollow, substantially parallelepiped first portion 5 connected by an elbow-shaped portion to a hollow parallelepiped second portion 6 terminating with a substantially rectangular front opening 8 of casing 3.

Parallelepiped second portion 6 houses a lighting device 12 (conveniently comprising a number of aligned LEDs) for emitting optical beams F from opening 8 to illuminate an optical code 15, in particular a bar code, on an outer surface of an object 17.

The term "optical code" is intended to mean a set of graphic marks applied to a label or directly on an object (or any other type of support), and by which information is coded in the form of a sequence of black and white or variously coloured regions arranged in one or more directions. Examples of optical codes are bar codes, two-dimensional codes, and colour codes.

In the example shown, object 17 comprises a bar code BC defined by a number of straight parallel alternating dark/light bars.

Parallelepiped second portion 6 also houses a focusing device 20 for receiving the light rays G diffused by optical code 15 and focusing them onto a viewing device 22 (conveniently a CCD linear sensor, or a CCD matrix sensor for two-dimensional codes) housed inside casing 3; and an electronic circuit 24 powered by a battery (not shown) inside casing 3, and which cooperates with lighting device 12 and viewing device 22, and is supplied by viewing device 22 with an analog electric signal S, the time pattern of which reproduces the succession of light and dark regions of optical code 15. Alternatively, the lighting device may comprise a laser device (not shown) for emitting a laser beam onto a rotary mirror (not shown) to scan optical code 15.

Electronic circuit 24 comprises a microprocessor circuit 26 for processing digitized electric signal S (in known manner) and generating a succession of digital data C representing characters associated with optical code 15. Digital data C may be memorized in a memory unit 27 of electronic circuit 24 (or in the microprocessor itself) and later transferred, as explained later on, to a remote processing unit 30 comprising a central unite 30a, a visual display unit 30b, a known keyboard 31, and a known pointing device (MOUSE) 32. Keyboard 31 comprises first and second outputs 31a, 31b (FIG. 2) supplying digital data KB generated by operation of the keys on the board; and mouse 32 comprises first and second outputs 32a, 32b supplying digital data M correlated with the movement of mouse 32.

According to the present invention (FIG. 1), device 1 also comprises a further pointing device 33 (auxiliary MOUSE) fitted to casing 3 and in turn comprising a manually operated body 35 accessible from outside casing 3 (e.g. a joystick, or a ball fitted to a supporting device on a wall 5a of portion 5, and rotatable by any angle about its center), and a coding device 37 connected to body 35 and for converting the angular movements of body 35 into electric signals supplied to microprocessor circuit 26, which generates digital data AM by which to move, on visual display unit 30b, a graphic interface pointer 39 of a program (e.g. a WINDOWS operating system program) resident in remote unit 30.

More specifically (FIG. 2), microprocessor circuit 26 comprises first and second outputs 26a, 26b at which digital data C may be available, and third and fourth outputs 26c, 26d at which digital data AM is available. According to the present invention, device 1 also comprises a multiplexer circuit 42, which receives the KB and M data generated respectively by keyboard 31 and mouse 32, together with the C and AM data at outputs 26a, 26b, 26c, 26d, and generates output data which is supplied to a keyboard input 44 and to a mouse input 45 of central unit 30a.

More specifically, multiplexer circuit 42 comprises a first pair of solid-state switches 50a, 50b having first input terminals connected respectively to outputs 26a, 26b of microprocessor 26 by electric lines 51a, 51b, and second output terminals connected to keyboard input 44 by respective electric lines 52a, 52b; and a second pair of solid-state switches 56a, 56b having first input terminals connected respectively to outputs 31a, 31b of keyboard 31 by electric lines 57a, 57b, and second output terminals connected to keyboard input 44 by electric lines 52a, 52b. The two pairs of switches 50a, 50b and 56a, 56b are operated (as described later on) in phase opposition by a control signal CNTRL1 from microprocessor 26, so that, when switches 50a, 50b are closed, switches 56a, 56b are open and vice versa; and all four switches 50a, 50b, 56a, 56b are conveniently formed in a single (e.g. HC4066) integrated circuit supplied with control signal CNTRL1.

Multiplexer circuit 42 also comprises a third pair of solid-state switches 60c, 60d having first input terminals connected respectively to outputs 26c, 26d of microprocessor 26 by electric lines 62c, 62d, and second output terminals connected to mouse input 45 by respective electric lines 64c, 64d; and a fourth pair of solid-state switches 66c, 66d having first input terminals connected respectively to outputs 32a, 32b of mouse 32 by electric lines 67c, 67d, and second output terminals connected to mouse input 45 by electric lines 64c, 64d. The two pairs of switches 60c, 60d and 66c, 66d are operated (as described later on) in phase opposition by a control signal CNTRL2 from microprocessor 26, so that, when switches 60c, 60d are closed, switches 66c, 66d are open and vice versa; and all four switches 60c, 60d, 66c, 66d are conveniently formed in a single (e.g. HC4066) integrated circuit supplied with control signal CNTRL2.

In actual use, the digital KB data on lines 57a, 57b from keyboard 31 is supplied to multiplexer circuit 42, by which it is transferred to keyboard input 44 when switches 56a, 56b are closed (and switches 50a, 50b open); and any C data on lines 51a, 51b is prevented by open switches 50a, 50b from being supplied to keyboard input 44.

The digital C data resulting from reading optical code 15 and present at outputs 26a, 26b of microprocessor 26 is supplied to multiplexer 42, by which it is transferred to keyboard input 44 when switches 50a, 50b are closed (and switches 56a, 56b open); and any KB data on lines 57a, 57b is prevented by open switches 56a, 56b from being supplied to keyboard input 44.

The digital M data on lines 67c, 67d from mouse 32 is supplied to multiplexer circuit 42, by which it is transferred to mouse input 45 when switches 66c, 66d are closed (and switches 60c, 60d open); and any AM data on lines 62c, 62d is prevented by open switches 60c, 60d from being supplied to mouse input 45.

The digital AM data resulting from operation of pointing device 33 and present at outputs 26c, 26d of microprocessor 26 is supplied to multiplexer circuit 42, by which it is transferred to mouse input 45 when switches 60c, 60d are closed (and switches 66c, 66d open); and any M data on lines 67c, 67d is prevented by open switches 66c, 66d from being supplied to mouse input 45.

Multiplexer circuit 42 therefore provides for transferring to central unit 30a the KB data generated by operation of keyboard 31, or the C data resulting from reading optical code 15 and which is also supplied directly to keyboard input 44. Similarly, multiplexer circuit 42 provides for transferring to central unit 30a the M data generated by operation of mouse 32, or the AM data from auxiliary mouse 33 of reading device 1, so that pointer 39 may be moved by mouse 32 of the personal computer, or by the mouse of reading device 1.

Device 1 may also comprise a first number of keys 60 operated manually and located, for example, on wall 5a of casing 3; and operation of each key 60 selects a respective location in an auxiliary memory (not shown) of circuit 24, which supplies (e.g. at outputs 26a, 26b) a set of MACRO digital data representing a command normally imparted to remote processing unit 30 from a keyboard, e.g. ENTER, ESCAPE, DELETE, etc. Similarly, device 1 may comprise a second number of keys 61 operated manually and located, for example, on wall 5a of casing 3; and operation of each key 61 selects a respective location in an auxiliary memory (not shown) of circuit 24, which supplies (e.g. at outputs 26c, 26d) a set of MC digital data representing a command normally imparted to remote processing unit 30 by a mouse, e.g. a click or double click command. The MACRO and MC data (like the C and AM data) is transferred by device 1 to processing unit 30 as described later on, and may be mixed and associated in sequence with the same key; and a sequence of keyboard KB data or mouse M data may be programmed as a preamble or postamble of a code.

Figure 4A:
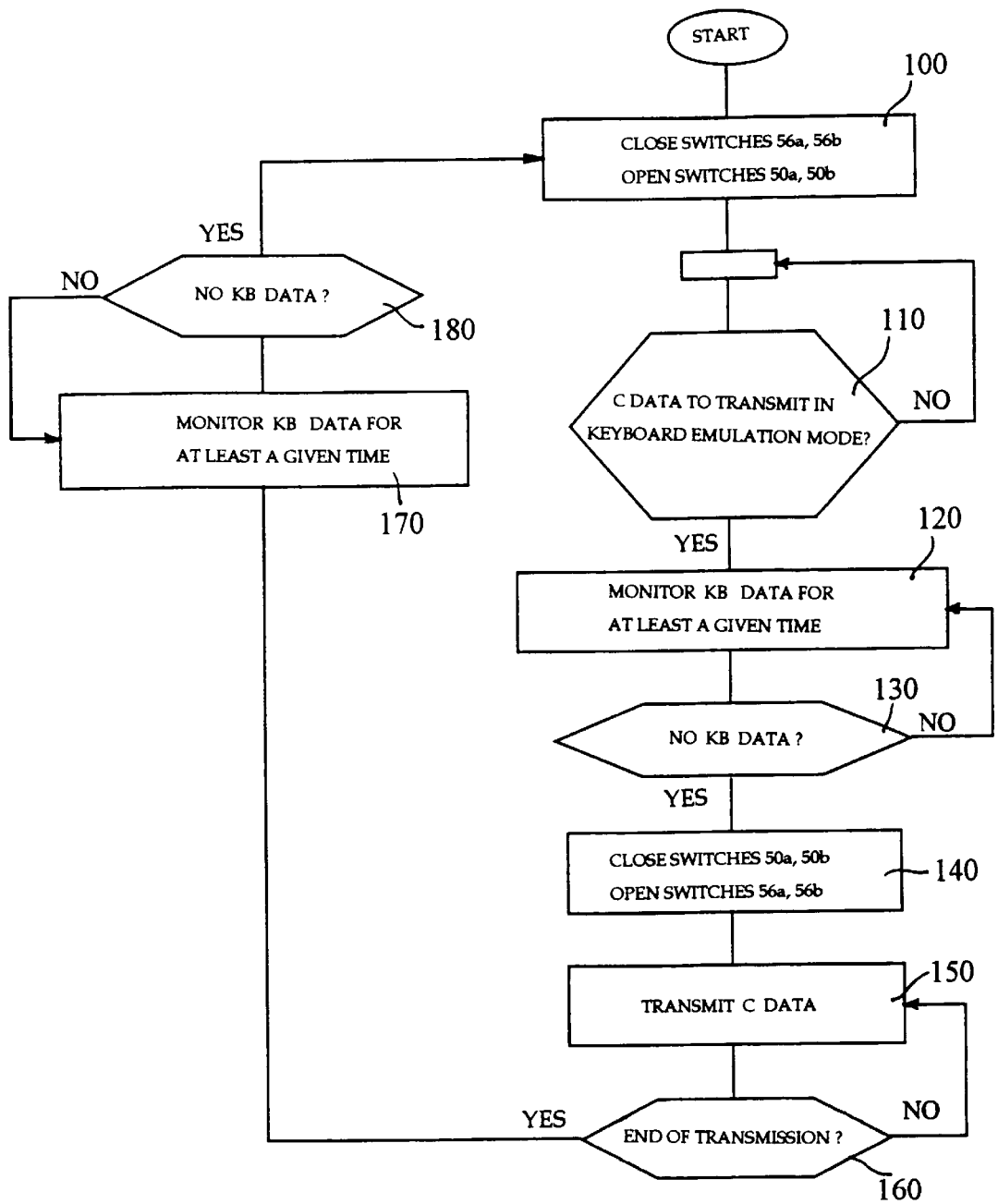
FIGS. 4a, 4b show logic operating block diagrams of the FIG. 2 circuit.

FIG. 4a shows a block diagram of the way in which microprocessor 26 controls the switches of multiplexer 42 via control signal CNTRL1.

To begin with, a block 100 closes switches 56a, 56b and opens switches 50a, 50b, so that keyboard 31 is connected to the central unit 30a with which it communicates, and no C data can be transmitted by reading device 1 to keyboard input 44.

Block 100 is followed by a block 110, which determines the presence at outputs 26a, 26b of C data (and/or MACRO data) for transmission in keyboard emulation mode. In the event of a negative response, block 110 remains on standby. Conversely, block 110 goes on to a block 120, which monitors the KB data on lines 57a, 57b, and is followed by a block 130 for selecting a block 140 when no KB data is detected on lines 57a, 57b for a predetermined period of time. In other words, block 140 is selected when keyboard 31 stops transmitting data to central unit 30a, thus ensuring no data from the keyboard is lost.

Block 140 closes switches 50*a*, 50*b* and opens switches 56*a*, 56*b*, so that the C data (and/or any MACRO data) may be transferred by device 1 to central unit 30*a*, and keyboard 31 is disconnected from central unit 30*a*. The C data (and/or MACRO data) is also transmitted by a block 150 downstream from block 140, so that the C data is used to move, on visual display unit 30*b*, the pointer 39 of the graphic interface of the program resident at the time in remote unit 30, and the MACRO data is used to impart to the program commands normally imparted by a keyboard.

Block 150 is followed by a block 160, which determines whether transmission of the C data (and/or MACRO data) has been completed. In the event of a negative response, block 160 goes back to block 150. Conversely (end of data transmission by device 1 to central unit 30*a*), block 160 goes on to a block 170, which monitors the KB data on lines 57*a*, 57*b*, and is followed by a block 180 for reselecting block 100 when no KB data is detected on lines 57*a*, 57*b* for a predetermined period of time. In other words, block 100 can only be reselected when no more data is generated by keyboard 31, thus preventing improper or incomplete data transmission from keyboard 31 to central unit 30*a* due to nonsynchronized closing of switches 56*a*, 56*b*.

Figure 4B:
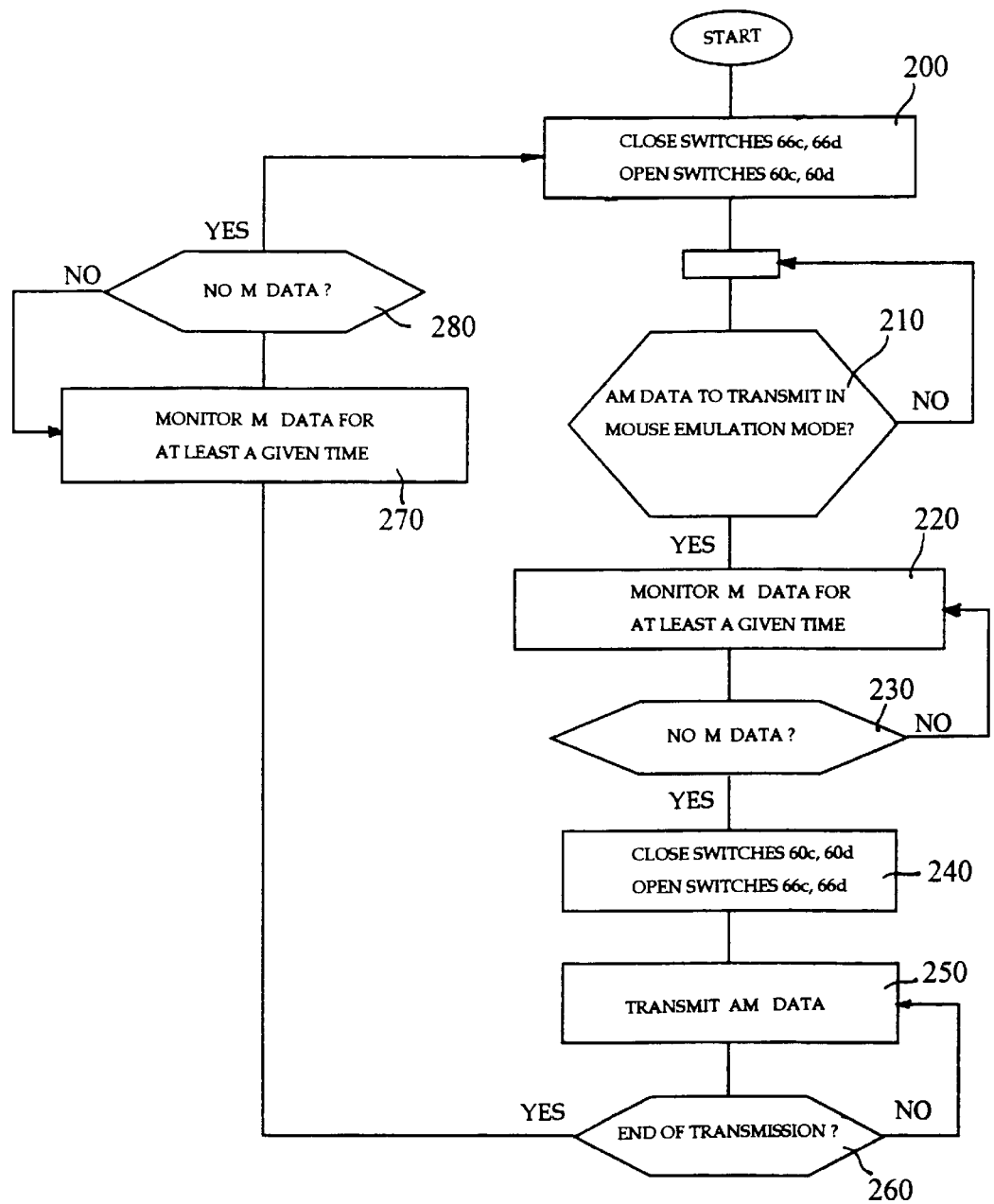

Similarly, FIG. 4*b* shows a block diagram of the way in which microprocessor 26 controls the switches of multiplexer 42 via control signal CNTRL2.

To begin with, a block 200 closes switches 66*c*, 66*d* and opens switches 60*c*, 60*d*, so that mouse 32 is connected normally to the central unit 30*a* with which it communicates, and no AM data (and/or any MC data) can be transmitted by reading device 1 to mouse input 45.

Block 200 is followed by a block 210, which determines the presence at outputs 26*c*, 26*d* of AM data generated by operation of mouse 33 integrated with reading device 1, or MC data generated by operation of keys 61. In the event of a negative response, block 210 remains on standby. Conversely, block 210 goes on to a block 220, which monitors the M data on lines 67*c*, 67*d*, and is followed by a block 230 for selecting a block 240 when no M data is detected on lines 67*c*, 67*d* for a predetermined period of time. In other words, block 240 is selected when mouse 32 is no longer being used.

Block 240 closes switches 60*c*, 60*d* and opens switches 66*c*, 66*d*, so that the AM data (and/or MC data) may be transferred by device 1 to central unit 30*a*, and mouse 32 is disconnected from central unit 30*a*. The AM data (and/or MC data) is also transmitted by a block 250 downstream from block 240.

Block 250 is followed by a block 260, which determines whether transmission of the AM data (and/or MC data) has been completed. In the event of a negative response, block 260 goes back to block 250. Conversely (end of AM (and/or MC) data transmission to central unit 30*a*, i.e. mouse 33 no longer being used), block 260 goes on to a block 270, which monitors the M data on lines 67*c*, 67*d*, and is followed by a block 280 for reselecting block 200 when no M data is detected on lines 67*c*, 67*d* for a predetermined period of time. In other words, block 200 can only be selected when mouse 32 is no longer being used, thus preventing improper or incomplete data transmission from mouse 32 to central unit 30*a* due to block 200 closing switches 66*c*, 66*d*.

The advantages of the present invention will be clear from the foregoing description. In particular, reading device 1 provides for employing graphic interface programs in which the graphic pointer is operated by mouse 33 directly accessible on device 1 itself, so that commands governing operation of the program and transfer of memorized data are imparted rapidly and easily. Operation of the microprocessor according to the present invention (FIG. 4*a*) also prevents any conflict between device 1 and keyboard 31, by the C (and/or MACRO) data and the KB data always being transmitted alternatively to central unit 30*a*. Moreover, data is only transferred by device 1 when any previous transfer of KB data has been completed (blocks 120, 130); and when the data C transfer is completed (block 160), the keyboard, as opposed to being immediately reconnected automatically, is only connected if it is not being used at the time (blocks 170, 180), thus preventing any error caused by untimed, nonsynchronized connection of the keyboard. Similarly, operation of the microprocessor according to the present invention (FIG. 4*b*) also prevents any conflict between device 1 and mouse 32, by the AM (and/or MC) data and the M data always being transmitted alternatively to central unit 30*a*. Moreover, data is only transferred by device 1 when any previous transfer of M data generated by mouse 32 has been completed (blocks 220, 230); and when the AM data transfer is completed (block 260), mouse 32, as opposed to being immediately reconnected automatically, is only connected if it is not being used at the time (blocks 270, 280), thus preventing any error caused by untimed, nonsynchronized connection of the mouse.

Figure 2:
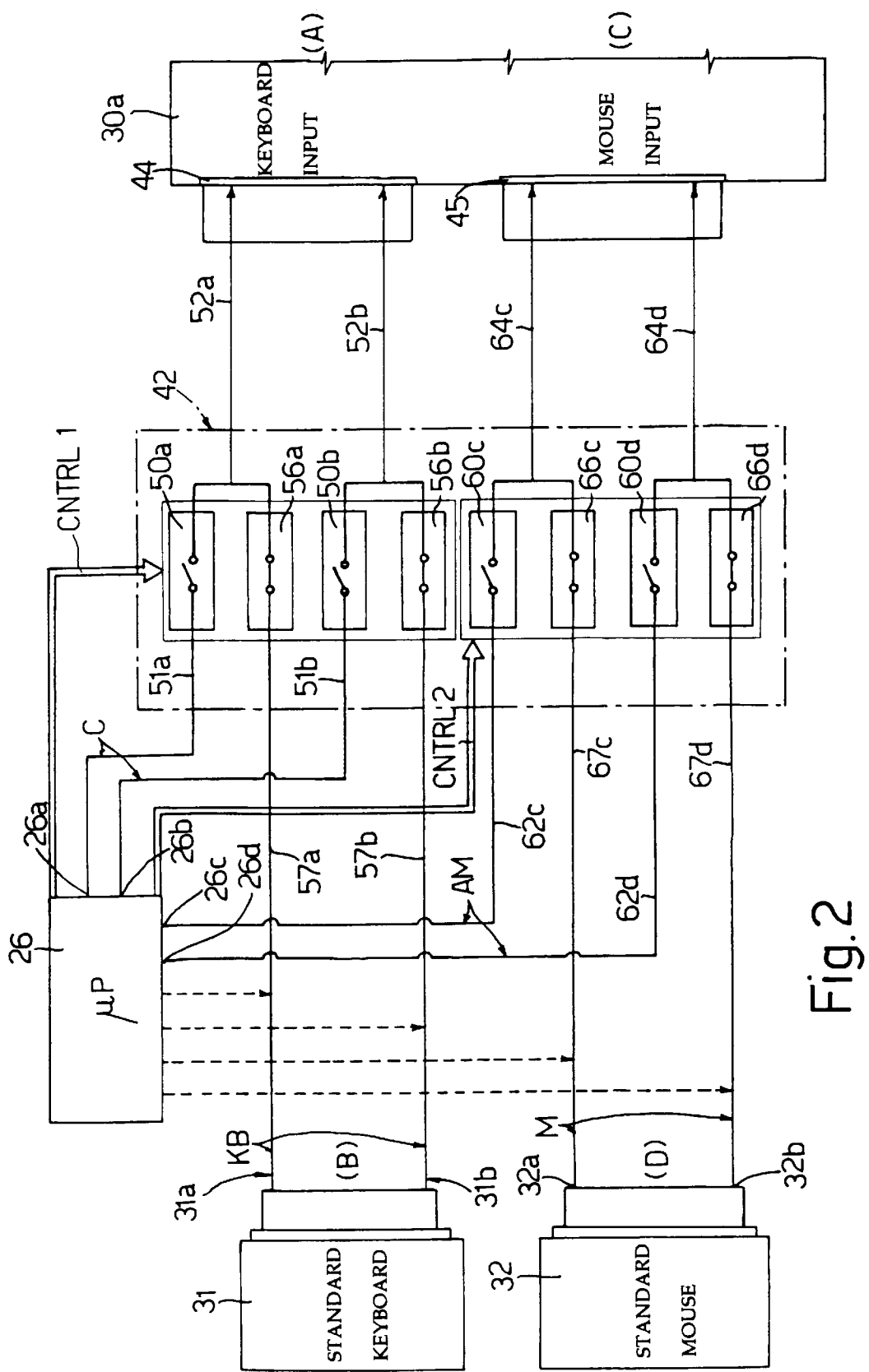
FIG. 2 shows a detailed diagram of a circuit of the FIG. 1 device.

The FIG. 3 variation differs from FIG. 2 by pairs of switches 50*a*, 50*b* and 60*c*, 60*d* being replaced by shortcircuits, so that microprocessor outputs 26*a*, 26*b* communicate directly with keyboard input 44 over electric lines 51*a*, 51*b* and 52*a*, 52*b*, and microprocessor outputs 26*c*, 26*d* communicate with mouse input 45 over electric lines 62*c*, 62*d* and 64*c*, 64*d*. Switches 56*a*, 56*b* are interposed between outputs 31*a*, 31*b* of keyboard 31 and keyboard input 44, and switches 66*c*, 66*d* are interposed between outputs 32*a*, 32*b* of mouse 32 and mouse input 45, so that the FIG. 3 circuit comprises only four switches as opposed to the eight in FIG. 2.

Figure 5A:
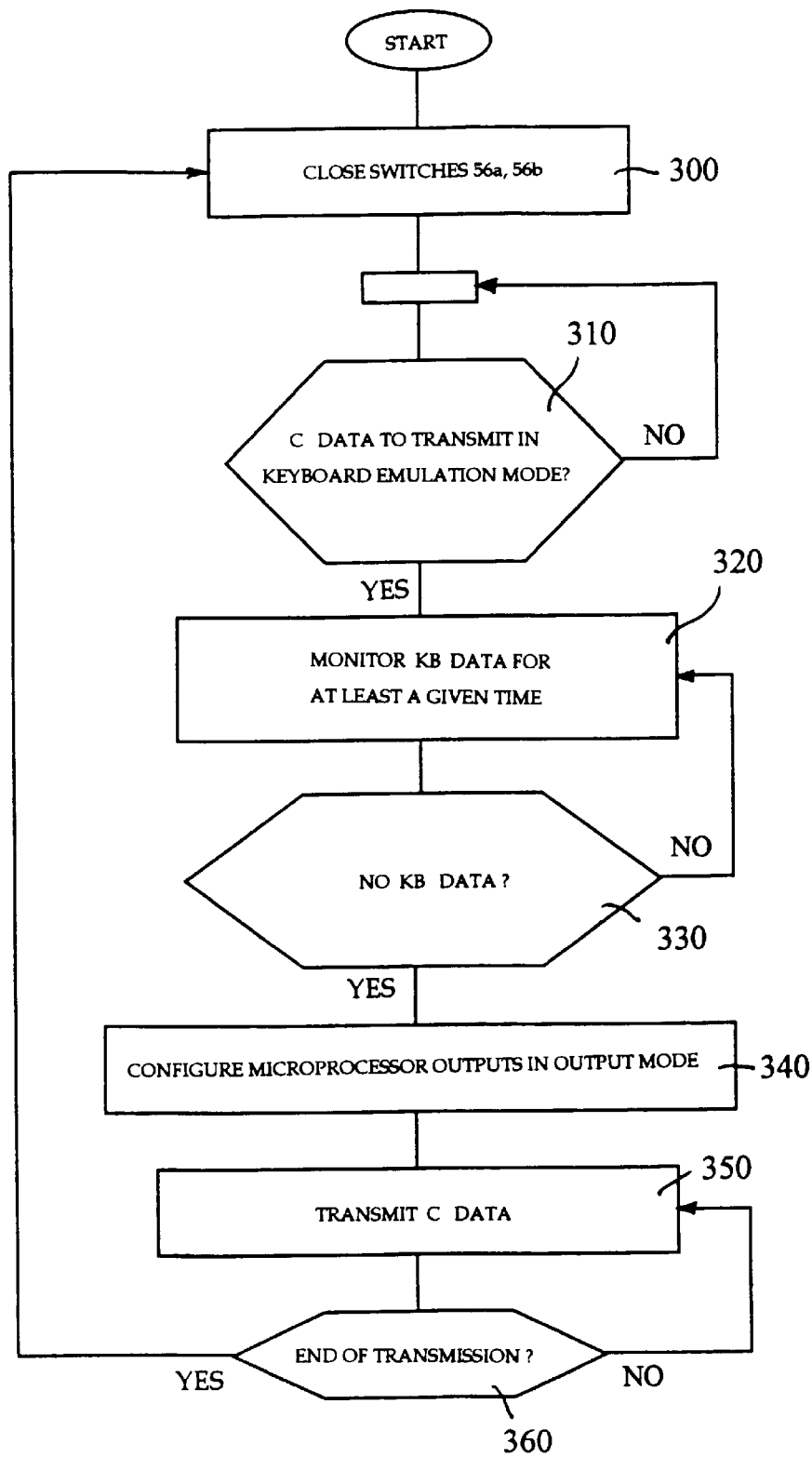
FIGS. 5a, 5b show logic operating block diagrams of the FIG. 3 circuit.
Figure 5B:
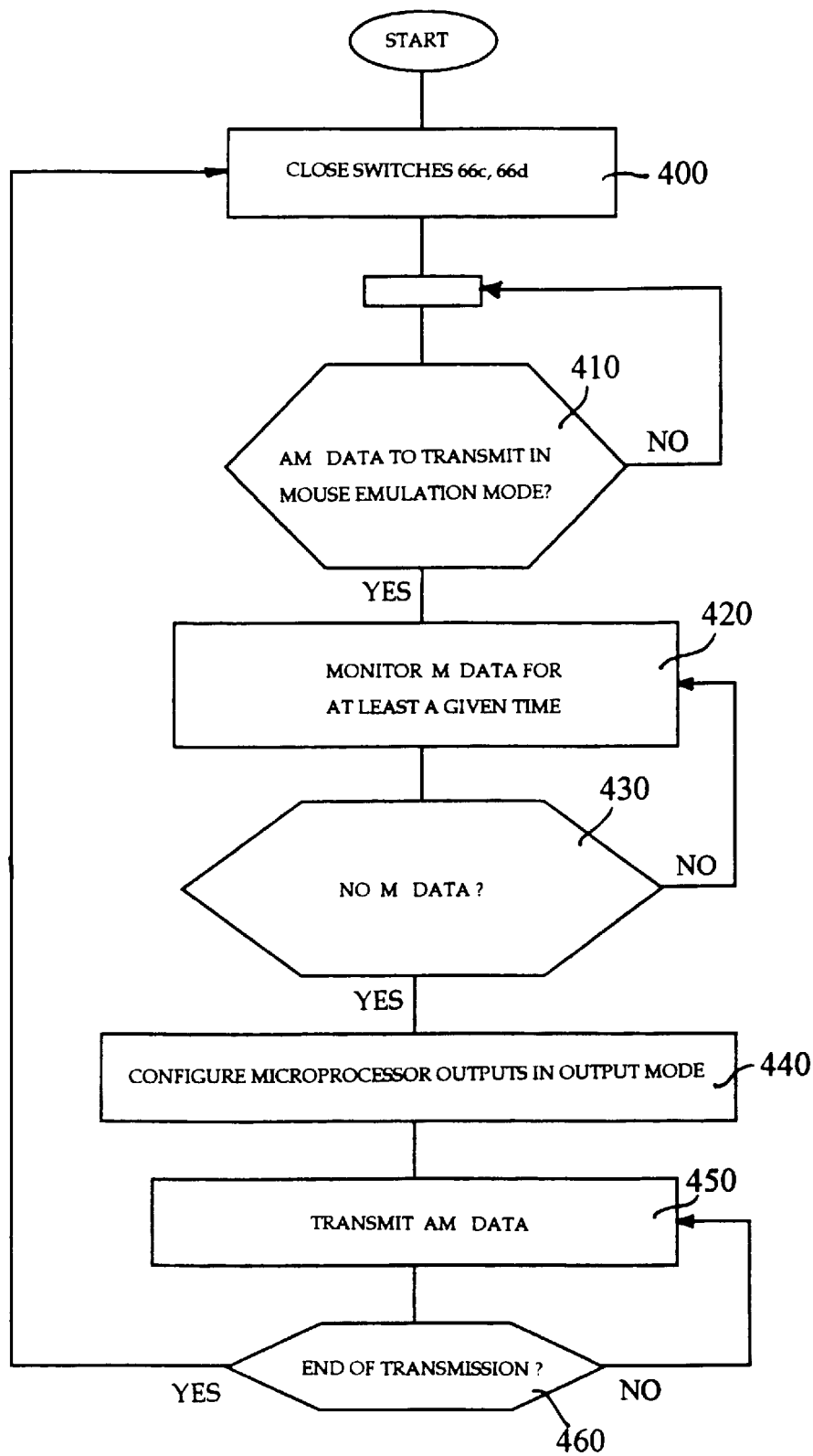

The switches are controlled (FIGS. 5*a*, 5*b*) in the same way as described with reference to FIGS. 4*a*, 4*b*, and, though no mention is made, for the sake of simplicity, of the MACRO and MC data in the following description, it is understood that these may be substituted for or associated with the C and AM data respectively.

To begin with (FIG. 5*a*), a block 300 closes switches 56*a*, 56*b*, so that keyboard 31 is connected to central unit 30*a*.

Block 300 is followed by a block 310, which determines the presence in memory 27 of any C data for transmission in keyboard emulation mode. In the event of a negative response, block 310 remains on standby. Conversely, block 310 goes on to a block 320, which (by means of microprocessor outputs 26*a*, 26*b* configured in this case in INPUT mode to permit data detection) monitors the KB data present on lines 57*a*, 57*b* due to closure of switches 56*a*, 56*b*. Block 320 is followed by a block 330 for selecting a block 340 when no KB data is detected on lines 57*a*, 57*b* for a predetermined period of time. In other words, block 340 is only selected when keyboard 31 has stopped transmitting data to central unit 30*a*, thus ensuring no data from the keyboard is lost.

Block 340 configures microprocessor outputs 26*a*, 26*b* (formerly in INPUT mode) in OUTPUT mode to transmit the memorized C data along lines 51*a*, 51*b*, so that the C data can be transferred by device 1 to central unit 30*a*, while keyboard 31 is disconnected from central unit 30*a*. C data transmission is also controlled by a block 350 downstream from block 340.

Block 350 is followed by a block 360, which determines whether transmission of the C data has been completed. In the event of a negative response, block 360 goes back to block 350. Conversely (end of C data transmission to central unit 30a), block 360 goes back to block 300, which closes switches 56a, 56b and restores communication between keyboard 31 and central unit 30a.

Similarly (FIG. 5b), a block 400 first closes switches 66c, 66d, so that mouse 32 is connected to central unit 30a.

Block 400 is followed by a block 410, which determines the presence of AM data generated by operation of mouse 33 integrated with reading device 1. In the event of a negative response, block 410 remains on standby. Conversely, block 410 goes on to a block 420, which (by means of microprocessor outputs 26c, 26d configured in this case in INPUT mode to permit data detection) monitors the M data on lines 67c, 67d. Block 420 is followed by a block 430 for selecting a block 440 when no M data is detected on lines 67c, 67d for a predetermined period of time. In other words, block 440 is only selected when mouse 32 is no longer being used.

Block 440 opens switches 66c, 66d, so that, once outputs 26c, 26d (formerly in INPUT mode) are configured in OUTPUT mode, the AM data can be transferred by device 1 to central unit 30a, while mouse 32 is disconnected from central unit 30a. AM data transmission is also controlled by a block 450 downstream from block 440.

Block 450 is followed by a block 460, which determines whether transmission of the AM data has been completed. In the event of a negative response, block 460 goes back to block 450. Conversely (end of AM data transmission to central unit 30a, i.e. mouse 33 no longer being used), block 460 goes back to block 400, which closes switches 66c, 66d and restores communication between mouse 32 and central unit 30a.

What is claimed is:

1. In a portable code reading device comprising:
   an electronic reading means for generating signals related to an examined code;
   a control circuit means cooperating with said electronic reading means to generate digital code data representing the examined code;
   a supporting means for supporting said electronic reading means and said control circuit means;
   a pointing means, capable of manual operation, for generating digital pointing control data by which to control a pointer of a remote processing device;
   wherein said remote processing device includes a user interface and a keyboard for communicating with said remote processing device, whereby said user interface is usable in conjunction with said pointer, said remote processing device further including at least one communication port;
   the improvement comprising an interface means for communicating data between said portable code reading device and said remote processing device, said interface means comprising:
      a code interface input capable of receiving said digital code data;
      a keyboard interface input capable of receiving digital keyboard data generated by said keyboard;
      an interface output capable of communicating with said interface inputs and said communication port of said remote processing device; and
      an interface input selecting means capable of selecting one of said code or said keyboard interface inputs in response to a control signal, whereby the selected input is thereafter capable of transmitting said digital code data or said digital keyboard data through said interface output, and thereafter to said communications port of said remote processing device.

2. A portable code reading device according to claim 1 wherein said control circuit means includes a switching mechanism capable of selectively controlling the transmission of digital data;
   wherein said control circuit means monitors the presence or absence of said digital code data and said digital keyboard data;
   whereby, when said digital code data is detected at said code interface input, and when an absence of digital keyboard data at said keyboard interface input is detected, said switching mechanism permits electrical connection of said code interface input to said interface output,
   said digital code data thereafter being transmitted to said remote processing device utilizing said communications port.

3. A portable code reading device according to claim 1 wherein said control circuit means includes a switching mechanism capable of selectively controlling the transmission of digital data;
   wherein said control circuit means monitors the presence or absence of said digital code data and said digital keyboard data;
   whereby when an absence of digital code data is detected at said code interface input, and an absence of digital keyboard data is detected at said keyboard interface input, said switching mechanism permits electrical connection of said keyboard interface input to said interface output.

4. In a portable code reading device comprising:
   an electronic reading means for generating signals related to an examined code;
   a control circuit means cooperating with said electronic reading means to generate digital code data representing the examined code;
   a supporting means for supporting said electronic reading means and said control circuit means;
   a pointing means, capable of manual operation, for generating digital pointing control data by which to control a pointer of a remote processing device;
   wherein said remote processing device includes a user interface and a mouse for communicating with said remote processing device, whereby said user interface is usable in conjunction with said pointer, said remote processing device further including at least one communication port;
   the improvement comprising an interface means for communicating data between said portable code reading device and said remote processing device, said interface means comprising:
      a pointing interface input capable of receiving said digital pointing control data;
      a mouse interface input capable of receiving digital mouse data generated by said mouse;
      an interface output capable of communicating with said interface inputs and said communication port of said remote processing device; and
      an interface input selecting means capable of selecting one of said pointing or said mouse interface inputs in response to a control signal, whereby the selected input is thereafter capable of transmitting said digital pointing data or said digital mouse data through said interface output, and thereafter to said communications port of said remote processing device.

5. A portable code reading device according to claim 4 wherein said control circuit means includes a switching mechanism capable of selectively controlling the transmission of digital data;

wherein said control circuit means monitors the presence or absence of said digital pointing data and said digital mouse data;

whereby, when said digital pointing data is detected at said pointing interface input, and when an absence of digital mouse data at said mouse interface input is detected, said switching mechanism permits electrical connection of said pointing interface input to said interface output, said digital pointing data thereafter being transmitted to said remote processing device utilizing said communications port.

6. A portable code reading device according to claim 4 wherein said control circuit means includes a switching mechanism capable of selectively controlling the transmission of digital data;

wherein said control circuit means monitors the presence or absence of said digital pointing data and said digital mouse data;

whereby when an absence of digital pointing data is detected at said pointing interface input, and an absence of digital mouse data is detected at said mouse interface input, said switching mechanism permits electrical connection of said mouse interface input to said interface output.

7. In a portable code reading device comprising:

an electronic reading means for generating signals related to an examined code;

a control circuit means cooperating with said electronic reading means to generate digital code data representing the examined code;

a supporting means for supporting said electronic reading means and said control circuit means;

a pointing means, capable of manual operation, for generating digital pointing control data by which to control a pointer of a remote processing device;

wherein said remote processing device includes a user interface and a keyboard for communicating with said remote processing device, whereby said user interface is usable in conjunction with said pointer, said remote processing device further including at least one communication port;

the improvement comprising an interface means for communicating data between said portable code reading device and said remote processing device, said interface means comprising:

a code interface input capable of receiving said digital code data;

a keyboard interface input capable of receiving digital keyboard data generated by said keyboard;

an interface output capable of communicating with said interface inputs and said communication port of said remote processing device; and wherein said code interface input is electrically connected to said interface output; and wherein said interface means further includes a switching means interposed between said keyboard interface input and said interface output, whereby said switching means may be activated to electrically connect or electrically disconnect said keyboard interface input to or from said interface output.

8. A portable code reading device according to claim 7 wherein said control circuit means includes a switching mechanism capable of selectively controlling the transmission of digital data;

wherein said control circuit means monitors the presence or absence of said digital code data and said digital keyboard data;

whereby, when said digital code data is detected at said code interface input, and when an absence of digital keyboard data at said keyboard interface input is detected, said switching mechanism permits electrical connection of said code interface input to said interface output, said digital code data thereafter being transmitted to said remote processing device utilizing said communications port.

9. In a portable code reading device comprising:

an electronic reading means for generating signals related to an examined code;

a control circuit means cooperating with said electronic reading means to generate digital code data representing the examined code;

a supporting means for supporting said electronic reading means and said control circuit means;

a pointing means, capable of manual operation, for generating digital pointing control data by which to control a pointer of a remote processing device;

wherein said remote processing device includes a user interface and a mouse for communicating with said remote processing device, whereby said user interface is usable in conjunction with said pointer, said remote processing device further including at least one communication port;

the improvement comprising an interface means for communicating data between said portable code reading device and said remote processing device, said interface means comprising:

a pointing interface input capable of receiving said digital pointing control data;

a mouse interface input capable of receiving digital mouse data generated by said mouse;

an interface output capable of communicating with said interface inputs and said communication port of said remote processing device;

wherein said pointing interface input is electrically connected to said interface output; and wherein said interface means further includes a switching means interposed between said mouse interface input and said interface output, whereby said switching means may be activated to electrically connect or electrically disconnect said mouse interface input to or from said interface output.

10. A portable code reading device according to claim 9 wherein said control circuit means includes a switching mechanism capable of selectively controlling the transmission of digital data;

wherein said control circuit means monitors the presence or absence of said digital pointing data and said digital mouse data;

whereby, when said digital pointing data is detected at said pointing interface input, and when an absence of digital mouse data at said mouse interface input is detected, said switching mechanism permits electrical connection of said pointing interface input to said interface output, said digital pointing data thereafter being transmitted to said remote processing device utilizing said communications port.

11. A portable code reading device comprising:

an electronic reading means for generating signals related to an examined code;

a control circuit means cooperating with said electronic reading means to generate digital code data representing the examined code;

a supporting means for supporting said electronic reading means and said control circuit means;

a pointing means, capable of manual operation, for generating digital pointing control data by which to control a pointer of a remote processing device;

wherein said remote processing device includes a user interface which is usable in conjunction with said pointer, said remote processing device further including at least one communication port;

wherein said electronic reading means comprises an optical code reading means; and said pointing means is capable of use to control said user interface of said remote processing device and for data transfer between said portable code reading device and said remote processing device.

12. A portable code reading device according to claim 11 further including a memory means for at least temporarily storing digital code data.

13. A portable code reading device comprising:

an electronic reading means for generating signals related to an examined code;

a control circuit means cooperating with said electronic reading means to generate digital code data representing the examined code;

a supporting means for supporting said electronic reading means and said control circuit means;

a pointing means, capable of manual operation, for generating digital pointing control data by which to control a pointer of a remote processing device;

wherein said remote processing device includes a user interface whereby said user interface is usable in conjunction with said pointer, said remote processing device further including at least one communication port;

wherein said electronic reading means comprises an optical code reading means;

said pointing means is capable of use to control said user interface of said remote processing device and for data transfer; and further including an interface means for communicating data between said portable code reading device and said remote processing device, said interface means being capable of transmitting said digital code data and said digital pointer data to said remote processing device via independent electrical signals.

14. A portable code reading device comprising:

an electronic reading means for generating signals related to an examined code;

a control circuit means cooperating with said electronic reading means to generate digital code data representing the examined code;

a supporting means for supporting said electronic reading means and said control circuit means;

a pointing means, capable of manual operation, for generating digital pointing control data by which to control a pointer of a remote processing device;

wherein said remote processing device includes a user interface, whereby said user interface is usable in conjunction with said pointer, said remote processing device further including at least one communication port; and further including an interface means for communicating data between said portable code reading device and said remote processing device, wherein said interface means is capable of transmitting said digital code data and said digital pointer data to said remote processing device via independent electrical signals.

15. A portable code reading device according to claim 14 wherein said electronic reading means includes an optical code reading device.

16. A portable code reading device according to claim 14 further including at least one manually operable mechanism capable of generating digital MACRO data thereby to execute a command normally imparted by a keyboard;

wherein said digital macro data is capable of being transmitted to said remote processing device via said interface means.

17. A portable code reading device according to claim 14 further including at least one manually operable mechanism capable of generating digital data thereby to execute a command normally imparted by a mouse;

wherein said digital data is capable of being transmitted to said remote processing device via said interface means.

* * * * *